United States Patent
Zhu et al.

(10) Patent No.: US 9,628,442 B2
(45) Date of Patent: Apr. 18, 2017

(54) DNS SNOOPING TO CREATE IP ADDRESS-BASED TRUST DATABASE USED TO SELECT DEEP PACKET INSPECTION AND STORAGE OF IP PACKETS

(71) Applicant: Cisco Technology, Inc., San Jose, CA (US)

(72) Inventors: Peter Zhu, Cupertino, CA (US); Ashok Thirunarayanan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 3 days.

(21) Appl. No.: 14/746,155

(22) Filed: Jun. 22, 2015

(65) Prior Publication Data
US 2016/0373409 A1    Dec. 22, 2016

(51) Int. Cl.
*H04L 29/06*    (2006.01)
*H04L 29/08*    (2006.01)
(Continued)

(52) U.S. Cl.
CPC .... *H04L 63/0236* (2013.01); *G06F 17/30289* (2013.01); *G06F 17/30914* (2013.01);
(Continued)

(58) Field of Classification Search
CPC . H04L 63/0227; H04L 63/0236; H04L 63/14; H04L 63/1408; H04L 63/1416; H04L 63/1425; H04L 63/20
See application file for complete search history.

(56) References Cited

U.S. PATENT DOCUMENTS

| 6,006,268 A | 12/1999 | Coile et al. |
| 6,324,647 B1 | 11/2001 | Bowman-Amuah |

(Continued)

FOREIGN PATENT DOCUMENTS

| WO | 2015/084327 A1 | 6/2015 | |
| WO | WO 2015/084327 A1 * | 6/2015 | ............. G06F 21/00 |

OTHER PUBLICATIONS

Cisco, "Configuring Anomaly Detection", Cisco Intrusion Prevention System Manager Express Configuration Guide for IPS 7.0, retrieved Mar. 7, 2014 from http://www.cisco.com/c/en/us/td/docs/security/ips/7-0/configuration/guide/ime/imeguide7/ime_anomaly_detections.html#wp1996957, 18 pages.

(Continued)

*Primary Examiner* — Edward Zee
(74) *Attorney, Agent, or Firm* — Edell, Shapiro & Finnan, LLC (57) ABSTRACT

At a network device through which client devices communicate with a network, a database is created that maps Internet Protocol (IP) addresses each to a respective trust metric for a domain name associated with the IP address. An IP packet sent from a client device to the network and that indicates a destination IP address for a network-accessible resource associated with a domain name is intercepted. Using the destination IP address in the intercepted IP packet, the domain name trust metric mapped to the destination IP address is retrieved from the database. IP packets received from the destination IP address are processed based on the retrieved domain name trust metric and a predetermined trust metric criterion.

20 Claims, 10 Drawing Sheets

(51) Int. Cl.
*H04L 29/12* (2006.01)
*G06F 17/30* (2006.01)

(52) U.S. Cl.
CPC ...... *H04L 61/1511* (2013.01); *H04L 61/2007* (2013.01); *H04L 69/22* (2013.01); *H04L 69/329* (2013.01)

(56) References Cited

U.S. PATENT DOCUMENTS

| | | |
|---|---|---|
| 6,400,996 B1 | 6/2002 | Hoffberg et al. |
| 6,473,406 B1 | 10/2002 | Coile et al. |
| 7,451,193 B1 | 11/2008 | Coile et al. |
| 7,506,371 B1 | 3/2009 | Ben-Natan |
| 7,610,375 B2 | 10/2009 | Portolani et al. |
| 7,681,235 B2 | 3/2010 | Chesla et al. |
| 7,735,116 B1 | 6/2010 | Gauvin |
| 7,849,502 B1 | 12/2010 | Bloch et al. |
| 8,205,259 B2 | 6/2012 | Stute |
| 8,448,247 B2 | 5/2013 | Stute |
| 2008/0082662 A1 | 4/2008 | Dandliker et al. |
| 2009/0254663 A1* | 10/2009 | Alperovitch ............ H04L 45/02 709/227 |
| 2010/0188975 A1 | 7/2010 | Raleigh |
| 2014/0090058 A1* | 3/2014 | Ward .................. H04L 63/1433 726/23 |
| 2014/0259140 A1 | 9/2014 | Subramanian |

OTHER PUBLICATIONS

International Search Report and Written Opinion in counterpart International Application No. PCT/US2016/038319, mailed Sep. 21, 2016, 14 pages.

* cited by examiner

DOMAIN NAME - BASED TRUST DATABASE 126

| DOMAIN NAME (KEY) | REPUTATION SCORE | CATEGORY (STANDARD ENUMERATED VALUE) |
|---|---|---|
| www.google.com | 10 | 1020 (SEARCH ENGINE AND PORTAL) |
| www.yahoo.com | 9 | 1020 (SEARCH ENGINE AND PORTAL) |
| www.cisco.com | 10 | 1019 (BUSINESS AND INDUSTRY) |
| www.seller.com | 2 | 1006 (ADULT) |
| www.hacker.com | 1 | 1050 (HACKING) |
| www.facebook.com | 8 | 1069 (SOCIAL NETWORKING) |

FIG.5

IP ADDRESS - BASED TRUST DATABASE 122

| IP (e.g., IPv4/v6) ADDRESS (INDEX) | REPUTATION SCORE | CATEGORY | CREATION/MODIFICATION TIME(YYYY:MM:DD-HH:MM:SS) | QUERYING CLIENT UNIQUE IP LIST | DOMAIN NAME |
|---|---|---|---|---|---|
| 74.125.25.147 | 10 | 1020 | 2014:01:15-00:20:30 | 172.25.23.23<br>192.176.24.24 | www.google.com |
| 74.125.25.148 | 10 | 1020 | 2014:01:13-00:20:35 | 172.25.23.24 | www.google.com |
| 206.190.36.45 | 9 | 1020 | 2014:01:13-00:20:36 | 172.25.23.25 | www.yahoo.com |
| 173.37.145.84 | 10 | 1019 | 2014:01:13-00:20:37 | 172.25.23.23 | www.cisco.com |
| 64.210.140.1 | 2 | 1006 | 2014:01:13-00:20:38 | 172.25.23.23 | www.adult.com |
| 207.70.175.42 | 1 | 1050 | 2014:01:13-00:20:39 | 172.25.23.27 | www.hacker.com |
| 31.13.66.144 | 8 | 1069 | 2014:01:13-00:20:40 | 172.25.23.26 | www.facebook.com |
| 199.27.79.184 | 9 | 1058 | 2014:01:13-00:20:39 | 172.25.23.26 | www.cnn.com |

DNS SNOOPING TO CREATE IP ADDRESS-BASED TRUST DATABASE USED TO SELECT DEEP PACKET INSPECTION AND STORAGE OF IP PACKETS

TECHNICAL FIELD

The present disclosure relates to selection of deep packet inspection (DPI) of data packets and storage thereof for security purposes.

BACKGROUND

A network device that performs security functions, such as a firewall, is commonly used to protect networks, servers, and clients. A security function performed by a firewall on a flow of data packets passing through the firewall is Deep Packet Inspection (DPI). Often, DPI occurs at the application layer, i.e., layer 7, of the Open System Interconnection (OSI) model. Layer 7 DPI is generally resource-intensive because all of the data packets associated with a particular data packet flow need to be parsed down to layer 7 in real-time. On the other hand, experience shows that some reputable websites such as google.com and yahoo.com can be trusted, and thus a security-motivated layer 7 DPI on data packet flows from such websites may not be necessary. In such cases, performing layer 7 DPI wastes resources.

The network device may also gather data packets or portions thereof and store the gathered information to repositories for subsequent access by security-related analytics, reporting, forensics, and so on. In a packet data flow, to determine which data packets include information that should be stored to the repositories, e.g., to discover which packets include information deemed suspicious or that poses a security risk, the network security device generally performs DPI on all of the data packets, even though many may originate from reputable or trustworthy sources. Performing DPI on all of the data packets, including those from reputable sources, wastes resources.

DESCRIPTION OF EXAMPLE EMBODIMENTS

Overview

Client devices communicate with a network through a network device. An Internet Protocol (IP) address-based trust database that maps IP addresses each to a respective trust metric for a domain name associated with the IP address is created at the network device. An IP packet sent from a client device to the network and that indicates a destination IP address for a network-accessible resource associated with a domain name is intercepted. Using the destination IP address in the intercepted IP packet, the domain name trust metric mapped to the destination IP address is retrieved from the IP address-based trust database. IP packets received from the destination IP address are processed based on the retrieved domain name trust metric and a predetermined trust metric criterion.

Example Embodiments

Figure 1:
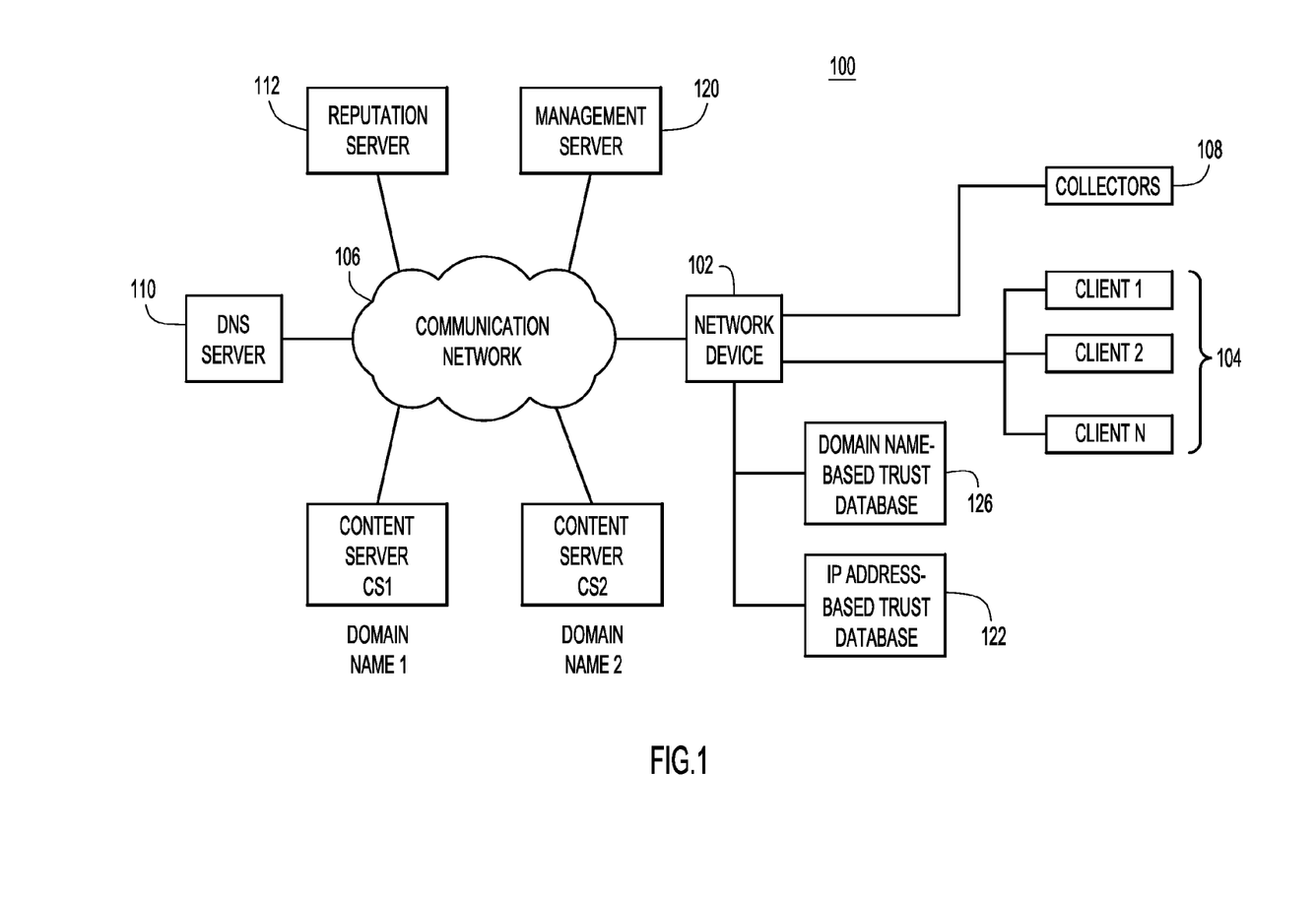
FIG. 1 is a block diagram of a network environment in which techniques presented herein may be implemented, according to an example embodiment.

Referring first to FIG. 1, there is shown a block diagram of an example network environment 100 in which embodiments presented herein may be implemented. Network environment 100 includes a network device 102, such as a network switch, a network router, or a network security device or appliance (e.g., a firewall), or a combination thereof, connected to a local network 104, such as a local area network (LAN), and a communication network 106 that may include one or more wide area networks (WANs), such as the Internet, and one or more local area network (LANs). Local network 104 includes client devices client1-clientN (also referred to as "clients" client1-clientN), which may include computer devices and/or applications hosted on computer devices that communicate with communication network 106 through network device 102. Network device 102 also communicates with one or more local storage collectors or repositories 108 to store information provided by the network device. Collectors 108 include large memory stores and may be part of local network 104 or separately connected to network device 102.

Network environment 100 also includes various resources connected with communication network 106 and thus accessible to network device 102 and clients client1-clientN through the network device, including: a Domain Name System (DNS) server 110 that stores network domain name-based databases that map various network domain names to corresponding Internet Protocol (IP) addresses for accessing resources (e.g., sources of content, such as content servers) associated with the domain names; a reputation server 112 that stores databases that map domain name reputations and/or domain name categories to corresponding domain names; various content servers CS1, CS2 that represent network-accessible resources (e.g., sources of content) associated with corresponding domain names (e.g., domain name1 and domain name2, respectively) and that are accessible using the IP addresses associated with the domain names; and a management or central server 120 to provide control information to network device 102 that is used in embodiments described herein. For convenience, only two content servers are shown in FIG. 1; however, there will typically be a large number of content servers connected with communication network 106

Clients client1-clientN establish connections with content servers (e.g., content servers CS1, CS2) through network device 102 and then exchange IP packets with the content servers through the network device. In support of network security operations, network device 102 may perform resource-intensive layer 7 DPI on some of the IP packets flowing from content servers; however, much of the content hosted by reputable content sources, e.g., websites, can be trusted because the sources are associated with a trusted domain name, thus layer 7 DPI on IP packets from such sources can be avoided. Accordingly, embodiments presented herein determine in an efficient manner whether to avoid layer 7 DPI on IP packets originated from content servers associated with domain names having corresponding domain name reputations.

In further support of network security operations, network device 102 may store to collectors 108 security-relevant portions of IP packets "of interest" originated from content servers (e.g., content servers CS1, CS2). An IP packet "of interest" is one that originates from a known threat source (e.g., threat server) or contains information of interest from a network security perspective. Such information of interest is often found at layer 7 of the IP packet. In one approach, network device 102 may perform layer 7 DPI on all IP packets regardless of where they originated to determine which of the IP packets contain information of interest and thus should be stored to collectors 108. This wastes resources because many content sources are know to be trustworthy and layer 7 DPI on IP packets from such sources can be avoided. Accordingly, further embodiments herein determine whether the IP packets are of interest and thus should be stored to collectors 108, without performing layer 7 DPI on all of the IP packets.

At a high-level, network device 102 initially creates an IP address-based reputation/category or "trust" database 122 having entries that map IP addresses associated with domain names to respective reputations and categories of the domain names. To create IP address-based trust database 122, network device 102 (i) downloads information from reputation server 112 into a domain name-based reputation/category or "trust" database 126 that maps domain names to respective reputations and categories, which are "trust metrics" indicative of domain name trustworthiness from a network security perspective, (ii) intercepts or "snoops" DNS transactions that clients client1-clientN use to resolve domain names to IP addresses associated with the domain names, and (iii) combines the reputations and categories (corresponding to the snooped domain names) with snooped IP addresses associated with the domain names to create entries in IP address-based trust database 122. Thus, IP address-based trust database 122 indicates different levels of trust for different IP addresses (associated with different domain names) based on reputations and/or categories associated with the IP addresses. Once network device 102 creates IP address-based trust database 122, the network device uses that database to determine whether IP packets flowing from a source (e.g., a content server) associated with a domain name should be subjected to layer 7 DNI snooping and/or stored to collectors 108 based on the IP address of the source indicated in IP packets originated at the source and the reputation and/or category stored in the entries of database 122.

Figure 2:
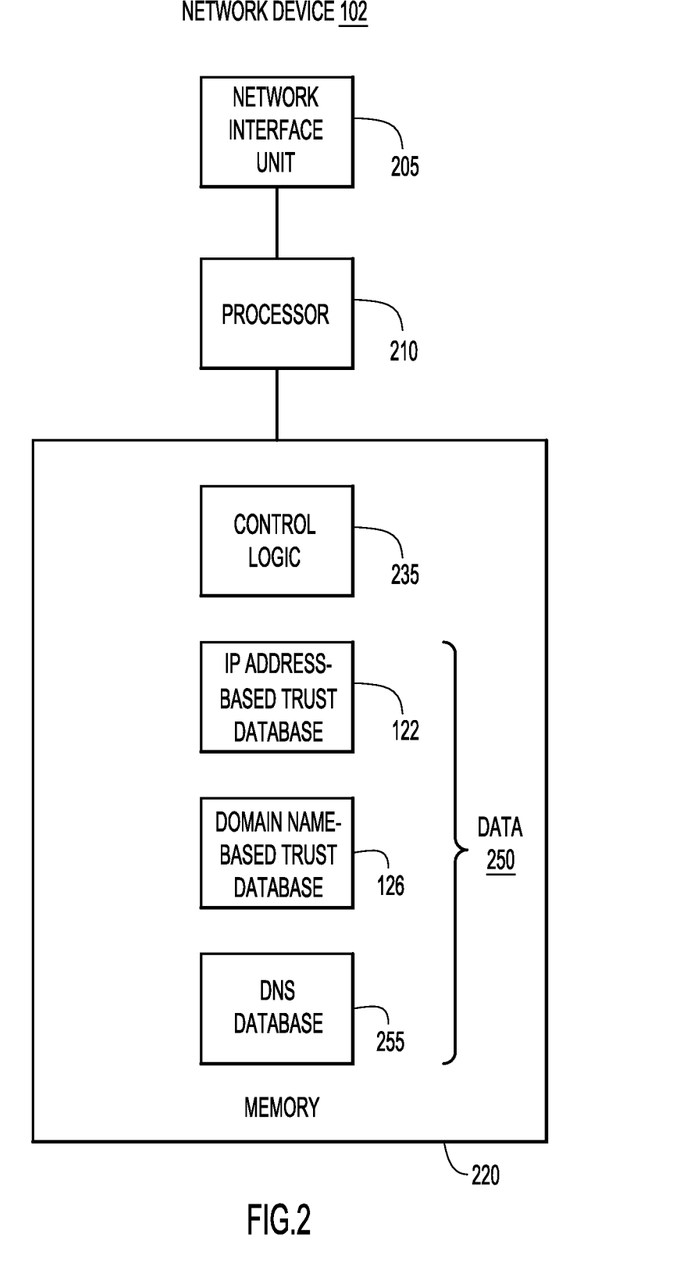
FIG. 2 is a block diagram of a network device configured to implement the techniques presented herein, according to an example embodiment.

With reference to FIG. 2, there is a block diagram of network device 102 configured to implement the embodiments described herein, according to an example embodiment. Network device 102 includes a network interface unit 205 configured to enable network communications so as to send messages to and receive messages from communication network 106, local network 104, and collectors 108. One or more processors 210 are provided that execute software stored in memory 220. Processor(s) 210 include, for example, one or more microprocessors and/or microcontrollers. To this end, the memory 220 stores instructions for software stored in the memory that are executed by processor(s) 210 to perform the methods described herein.

Memory 220 may comprise read only memory (ROM), random access memory (RAM), magnetic disk storage media devices, optical storage media devices, flash memory devices, electrical, optical, or other physical/tangible memory storage devices. Thus, in general, the memory 220 may comprise one or more tangible (non-transitory) computer readable storage media (e.g., a memory device) encoded with software comprising computer executable instructions and when the software is executed (by the processor(s) 210) it is operable to perform the operations described herein. Memory 220 may store control logic 235 (also referred to as "snooping logic") to implement methods described herein.

In addition, memory 220 stores data 250 used and generated by the processor 210 when executing logic 235 described above. Data 250 may include IP address-based trust database 122, domain name-based trust database 126, and a DNS database 255 that stores local DNS records downloaded from DNS server 110.

Figure 3:
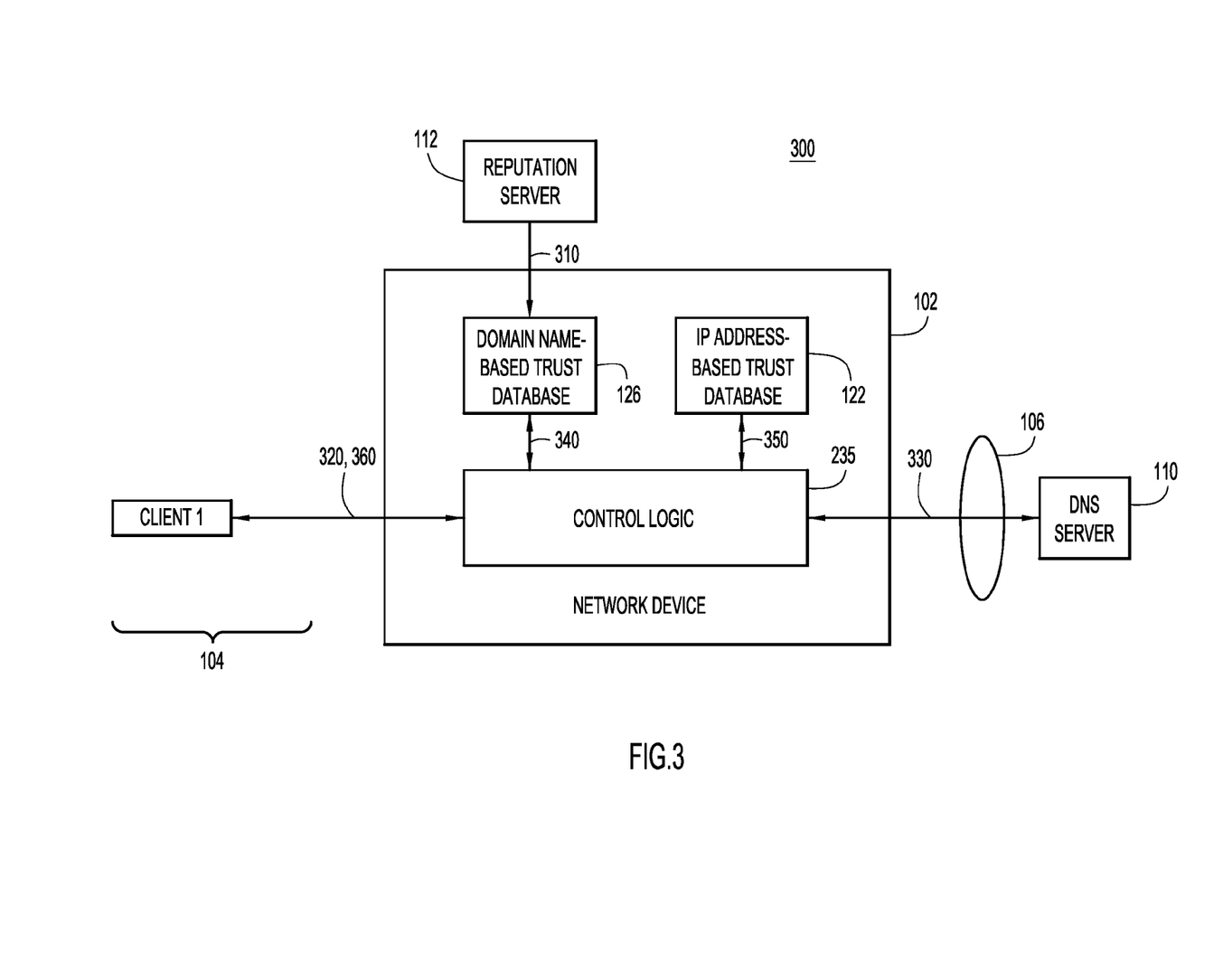
FIG. 3 is a block diagram of an arrangement of various devices from the network environment of FIG. 1 interconnected by various flows indicative of operations performed to create an Internet Protocol (IP) address-based reputation/category or "trust" database, according to an example embodiment.
Figure 4:
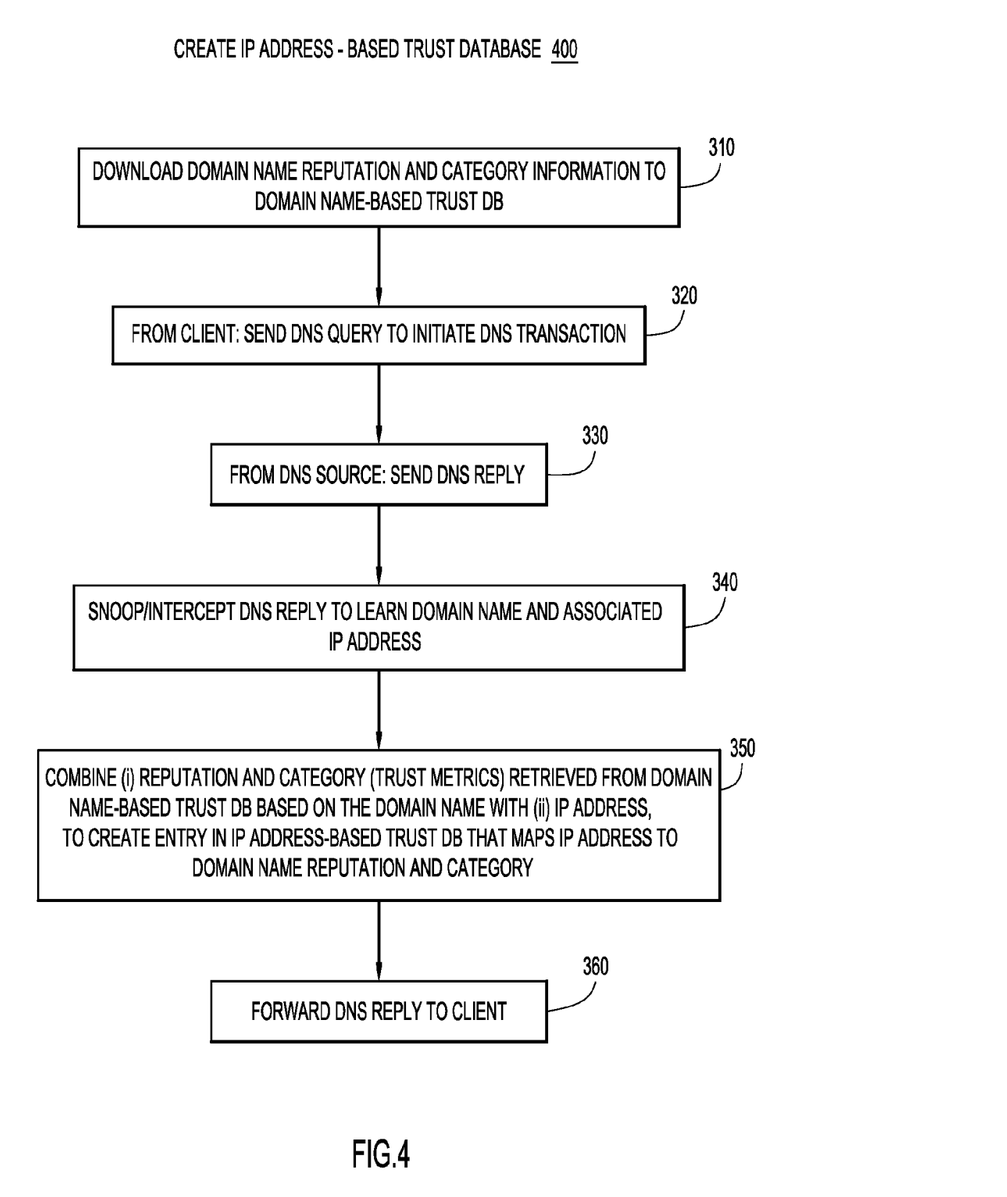
FIG. 4 is a flowchart of operations used to create the IP address-based trust database, according to an example embodiment.

With reference to FIGS. 3 and 4 together, the process by which network device 102 creates IP address-based trust database 122 is now described. FIG. 3 is a block diagram of an arrangement 300 of network device 102, DNS server 110, and client1 interconnected by various enumerated flows to indicate message transactions and operations (collectively referred to as "operations") that are correspondingly enumerated in FIG. 4. A given flow in FIG. 3 may coincide with multiple references numerals indicating multiple operations associated with that flow. FIG. 4 is a flowchart of operations 400 (individually enumerated in FIG. 3) used to create IP address-based trust database 122. Network device 102 executes control logic 235 to perform various ones of the operations 400. The description of operations 400 references actions initiated and performed with respect to client1 and content server CS1 by way of example only; the description applies generally to any client and content server or other source of content.

At 310, network device 102 periodically downloads information from reputation server 112 into domain name-based trust database (DB) 126. Database 126 includes entries each to map a domain name to a respective domain name reputation and a respective domain name category, which are examples of domain name trust metrics. The "category" associated with a domain name may be based on the types of functions performed or services provided by the network-accessible resources (such as content servers) associated with the domain name.

Figure 5:
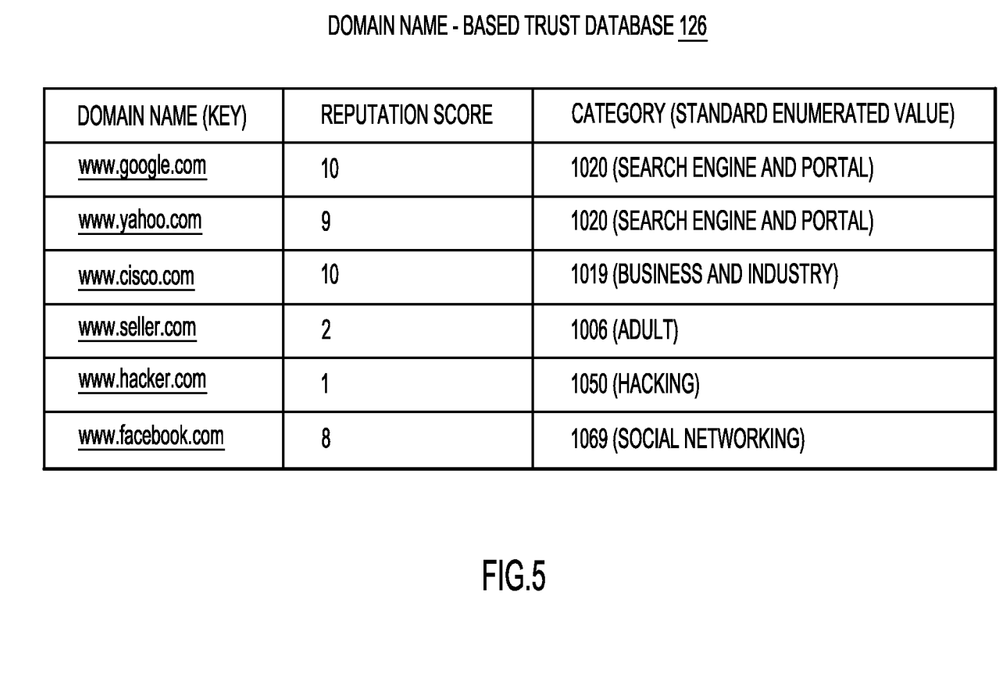
FIG. 5 is an illustration of an example of a domain name-based reputation/category or "trust" database, according to an example embodiment.

With reference to FIG. 5, there in an illustration of an example of domain name-based trust database 126 configured as a table. The rows of database 126 each correspond to a different domain name. Moving left-to-right, database 126 includes columns for domain name, reputation score (also referred to herein simply as "reputation"), and domain name category. In the example of FIG. 5, the reputation of a given domain name may be any number in a range from 0 to 10, where 0 is a lowest reputation indicative of a least trustworthy domain name and 10 is a highest reputation indicative of a most trustworthy domain name. The category of a given domain name includes a numerical value, but may also include a text description. For example, in the first row of database 126, the domain name www.google.com is assigned a reputation 10 and a category 1020 (search engine and portal).

Returning to method 400, at 320, before client1 can request content from content server CS1 associated with domain name1, the client initiates a DNS transaction to resolve domain name1 into an IP address through which the content server can be accessed. To initiate the DNS transaction, client1 sends a DNS query indicating domain name1 to either a local DNS database (e.g., database 255) or, if the local database is unable to satisfy the DNS query, DNS server 110.

At 330, a DNS reply including domain name1 taken from the DNS query and a resolved IP address associated with domain name1 is sent from DNS server 110 (or from local DNS database 255, e.g., via an application programming interface (API) associated with the local database) toward client1.

At 340, network device 102 intercepts and reviews or "snoops" the DNS reply. Network device 102 parses the "snooped" DNS replay packet to extract the domain name (e.g., domain name1) and the IP address therein (e.g., the IP address of content server CS1) associated with the domain name. Network device 102 uses the extracted or snooped domain name (e.g., domain name1) as an index into domain name-based trust database 126 to access the reputation and category for the domain name from the database. As a result, network device 102 has the domain name, the IP address associated with the domain name, the domain name reputation, and the domain name category.

At 350, network device 102 combines the IP address associated with the domain name, the domain name reputation, and the domain name category into an entry of IP address-based trust database 122 that maps the IP address to the domain name reputation and category and, in this way, creates the entry in the database. Although only one DNS transaction is snooped in this example, over time, network device 102 snoops many DNS transactions across clients client1-clientN to create many entries in database 122, where each entry maps an IP address associated with a domain name to a respective reputation and a respective category of the domain name.

At 360, network device 102 sends the DNS reply to client1 so that client1 can make subsequent content requests to content server1.

Figure 6:
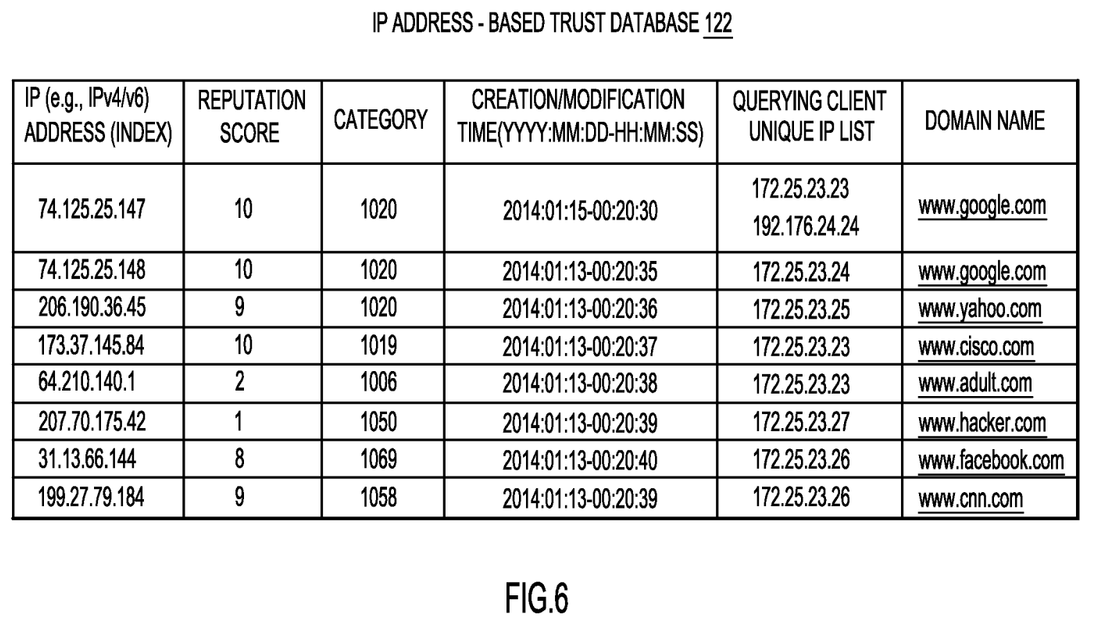
FIG. 6 is an illustration of an example of the IP address-based trust database created using the operations of FIG. 4, according to an example embodiment.

With reference to FIG. 6, there in an illustration of an example of IP address-based trust database 122. The rows or entries of database 122 each correspond to a different IP address associated with (i.e., used to access resources of) a respective domain name. Moving left-to-right, database 122 includes columns for a snooped IP address associated with a given domain name, domain name reputation, domain name category, a creation/modification time for a time and a date when a given entry/row was created in the database, a querying client unique IP list to list IP addresses of querying clients (e.g., IP addresses for clients among client1-clientN that initiated DNS transactions for a given domain name), an domain name associated with the IP address (this is optional). IP address-based trust database 122 is similar to domain name-based trust database 126, except that the IP address-based trust database replaces the domain name in the domain name field of the domain name-based trust database with the IP address associated with that domain name.

More than one querying/client IP address may be associated with the same domain name (e.g., www.google.com) because many of clients1-clientsN may wish to connect with a content server of a given domain name. As mentioned above, network device 102 creates or updates an entry in IP address-based trust database 122 each time the network device snoops a new DNS transaction (DNS query/response). Once created, an entry in IP address-based trust database 122 may not be deleted even if the particular client that initiated the DNS query leading to that entry finishes its network activities (e.g., accessing the corresponding content server). Therefore, it is likely that an entry in IP address-based trust database 122 for a particular content server may already exists before a next client initiates another DNS query to the domain name corresponding to that existing entry. The creation/modification time field in IP address-based trust database 122 may be used to purge older entries therein when the database grows too large. For example, entries having times and dates that indicate the entries have been in IP address-based trust database 122 for over a predetermined age-out time may be deleted.

DNS change malware protection of IP address-based trust database 122 may be implemented based on the client unique IP list field in the database. To implement this protection, each entry of the database is enabled only when a predetermined minimum, e.g., 5, queries from different clients for that entry are indicated in the client unique IP list field for that entry. This prevents a few, e.g., 5, clients among client1-clientN infected with DNS change malware from poisoning IP address-based trust database 122.

Figure 7:
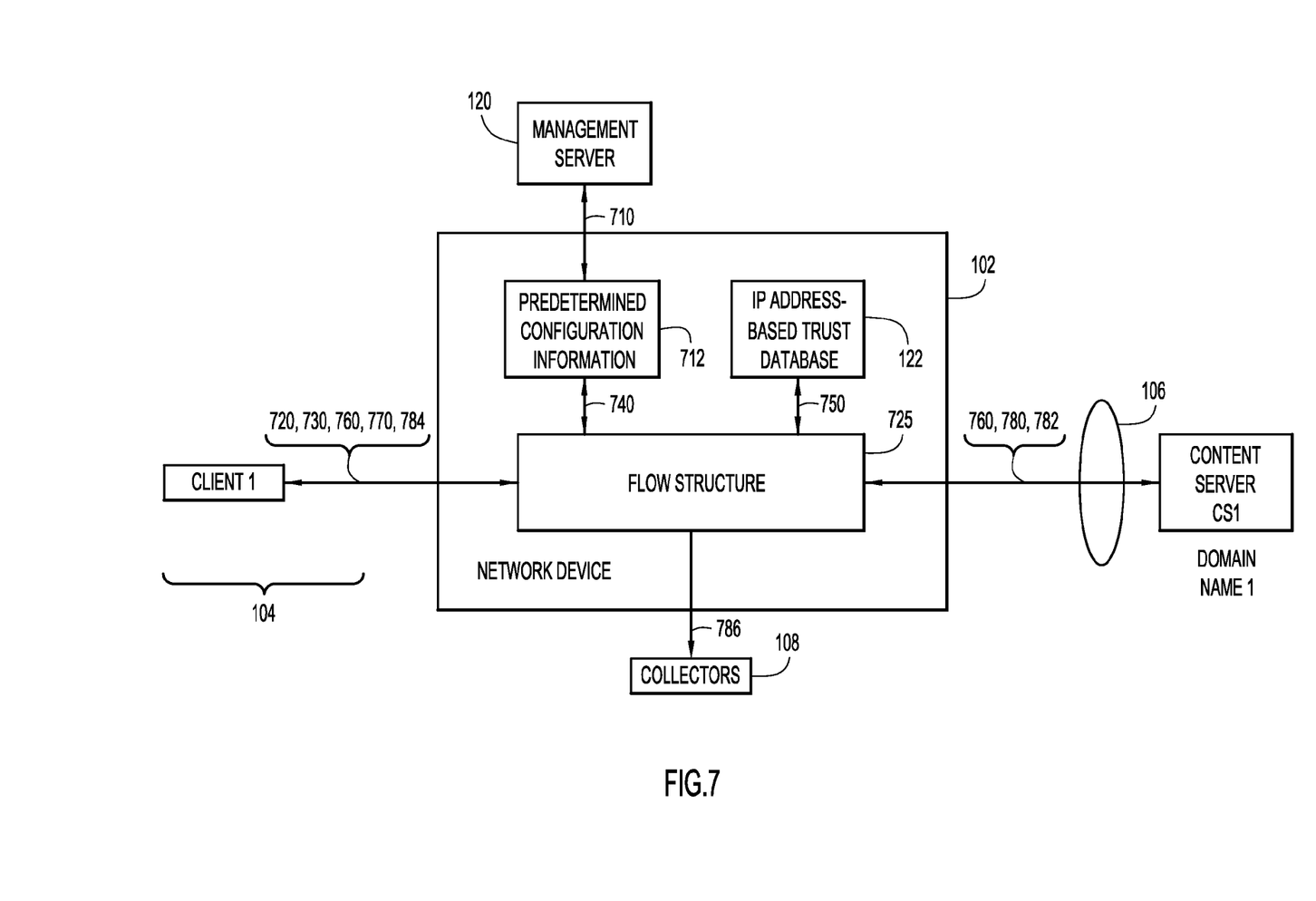
FIG. 7 is a block diagram of an arrangement of various devices shown in the network environment of FIG. 1 interconnected by flows indicative of operations performed to implement call processing based on the IP address-based trust database, according to an example embodiment.
Figure 8A:
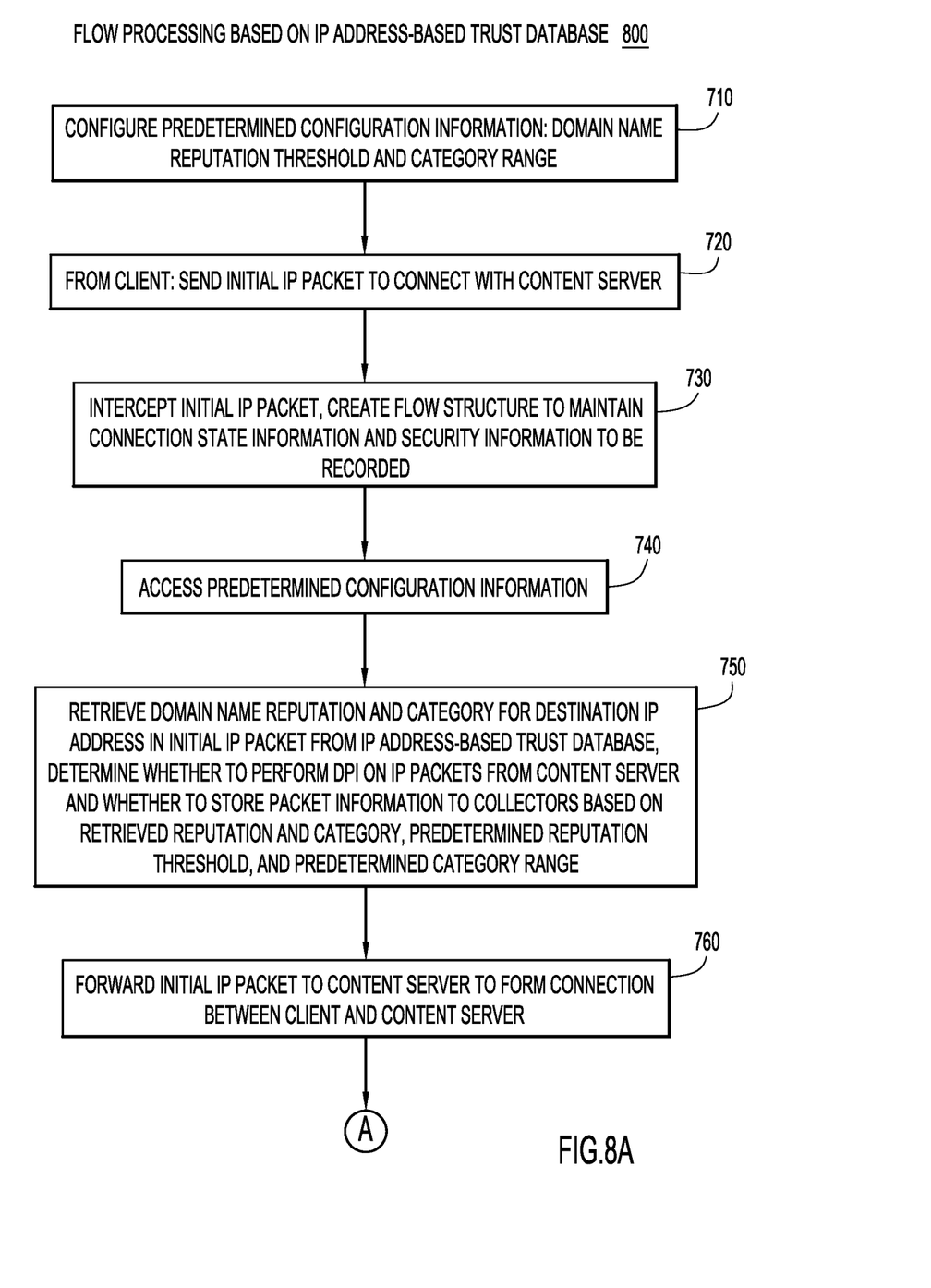
FIGS. 8A and 8B illustrate a flowchart of operations used to perform call processing based on the IP address-based trust database, according to an example embodiment.
Figure 8B:
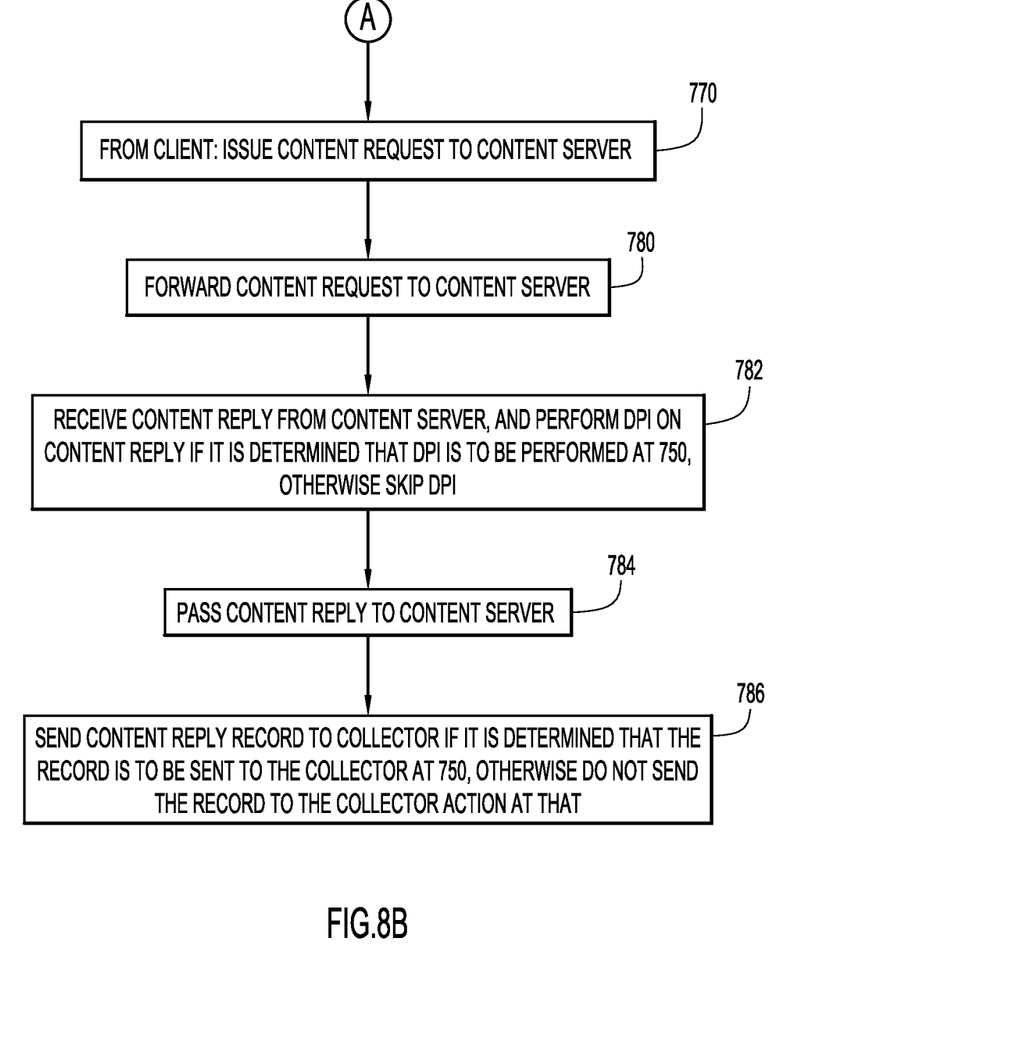

Once network device 102 creates IP address-based trust database 122 in accordance with method 400, the network device uses the database to assist with processing or handling flows between clients client1-clientN and various content servers (e.g., content servers CS1, CS2). With reference to FIGS. 7 and 8, the process by which network device 102 uses IP address-based trust database 122 to determine whether (e.g., layer 7) DPI should be performed on IP packets in a call flow and/or whether the IP packets (or portions thereof) should be stored in collectors 108, is now described.

FIG. 7 is a block diagram of an example arrangement 700 of network device 102, DNS server 110, and client1 interconnected by various enumerated flows to indicate message transactions and operations (collectively "operations") that are correspondingly enumerated in FIGS. 8A and 8B. A given flow in FIG. 7 may coincide with references numerals indicating multiple operations associated with that flow. FIGS. 8A and 8B are a flowchart of operations 800 (individually enumerated in FIG. 7) used to determine whether (e.g., layer 7) DPI should be performed on IP packets in a call flow and/or whether the IP packets (or portions thereof) should be stored in collectors 108. The description of operations 800 references actions initiated and performed with respect to client1 and content server CS1 by way of example only; the description applies generally to any client and content server or other source of content.

It is assumed that the operations of FIGS. 8A and 8B are performed after those of FIG. 4 are performed. Therefore, prior to the operations of FIGS. 8A and 8B, client1 has already resolved a domain name of interest (e.g., domain name1) to an IP address of a source of content (e.g., content server CS1) for that domain name. Operations 800 continue from that point in time.

At 710, predetermined configuration information 712, including a predetermined reputation threshold for performing DPI and a predetermined category range, is configured on network device 102 through management server 120 using a command line interface or a user interface, for example.

At 720, client1 sends an initial IP packet (e.g., a Transmission Control Protocol (TCP) SYN packet) to connect to content server CS1.

At 730, network device 102 intercepts the initial IP packet from client1 and creates a flow data structure 725 (also referred to more simply as a "flow structure" 725) to maintain stateful information for an anticipated connection between client1 and content server CS1. Flow structure 725 is keyed with the 5 tuples: source IP address (e.g., the address of requesting client1), destination IP address (e.g., the IP address of content source CS1), source and destination ports of network device 102, and a communication protocol to be used over the connection.

In addition, network device 102 may also store in flow structure 725 certain security information that may be forwarded to collectors 108. Such security information may include the domain name, the reputation, and the category (e.g., of the domain name associated with content server CS1). To access this security information, network device 102 uses the destination IP address (e.g., of content server CS1) in the intercepted IP packet to retrieve the reputation, the category, and the domain name (if available) for that IP address from IP address-based trust database 122. Even further security information may include information that maps between a content source IP (e.g., destination IP for content server CS1), a source user name, and a source user group, which may be ascertained through user authentication or access to an external database such an Authentication, Authorization, and Accounting (AAA) server (not shown in the Figures).

At 740, network device 102 accesses predetermined configuration information 712, including the predetermined reputation threshold and the predetermined category range.

At 750, based on the destination IP address (of content server CS1) in the intercepted initial IP packet, network device 102 retrieves from IP address-based trust database 122 the reputation corresponding to the destination IP address (e.g., the reputation of content server CS1). Network device 102 determines whether to perform DPI on IP packets subsequently received from the destination IP address based on the retrieved reputation and the predetermined reputation threshold. For example, network device 102 compares the retrieved reputation to the predetermined reputation threshold. If the retrieved reputation is greater than the retrieved threshold, network device 102 declares that DPI should not be performed and sets a "DPI_needed" flag in flow structure 725 to "No." If the retrieved reputation is less than or equal to the retrieved threshold, network device 102 declares that DPI should be performed and sets the "DPI_needed" flag in flow structure 725 to "yes."

Also at 750, based on the destination IP address (e.g., of content server CS1) in the intercepted initial IP packet, network device 102 retrieves from IP address-based trust database 122 the category corresponding to the destination IP address (e.g., the category of content server CS1). Network device 102 determines whether to store to collectors 108 records that include the above-mentioned security information and portions of IP packets (e.g., IP packet header information) subsequently received from the destination IP address based on the retrieved category and/or the retrieved reputation. Network device 102 may determine whether to store the records using the following example rules:

a. Store the records only if the reputation falls into a predetermined reputation range, e.g., between 0 and 4, inclusive.
b. Store the records only if the category belongs to one or more predetermined categories, e.g., adult or hacking.
c. Store the records only for a certain source user name or source user group.
d. Store the records to different collectors among collectors 108 based on reputation and category. For example, store records associated with a reputation below 5 to a first one of collectors 108 and store records associated with a reputation above or equal to 5 to a second one of the collectors.
e. Store the records based on various combination of rules (a)-(d).

At 760, the initial IP packet is sent to content server CS1, which replies, and a client-server connection between client1 and content server CS1 is established.

At 770, after the client-server connection is established, client1 issues a content request such as Hypertext Transfer Protocol (HTTP) GET, for example, which is received at network device 102.

At 780, network device 102 forwards the content request to content server CS1 without inspection. Content server CS1 sends a reply (e.g., sends an IP packet that indicates "200 OK" for HTTP GET).

At 782, network device 102 receives the reply from content server CS1. To process the reply, network device accesses information in flow structure 725 based on the 5 tuples indicated as IP header information in the reply. If the "DPI_needed" flag in flow structure 725 is set to "No," network device 102 does not perform DPI on the reply. If the "DPI_needed" flag is set to "Yes," network device 102 performs DPI. Subsequent IP packets flowing from content server CS1 to client1 are handled similarly.

At 784, network device 102 passes the reply to client1.

At 786, if it is determined that network device 102 should send a record for the reply to collectors 108 based on one or more of the rules (a)-(d) mentioned above, the network device sends the record to the collectors. Otherwise, network device 102 does not send the record to collectors 108. Subsequent IP packets flowing from content server CS1 to client1 are handled similarly.

Operations described above in connection with FIGS. 4, 8A and 8B associated with creating IP address-based trust database 122 to map IP addresses to domain name reputations and then using the database during flow processing to determine whether to perform DPI on IP packets may be performed separately and independently of operations associated with creating IP address-based trust database 122 to map IP addresses to domain name categories and/or reputations and then using the trust database to determine whether to store records associated with IP packets to collectors 108.

Figure 9:
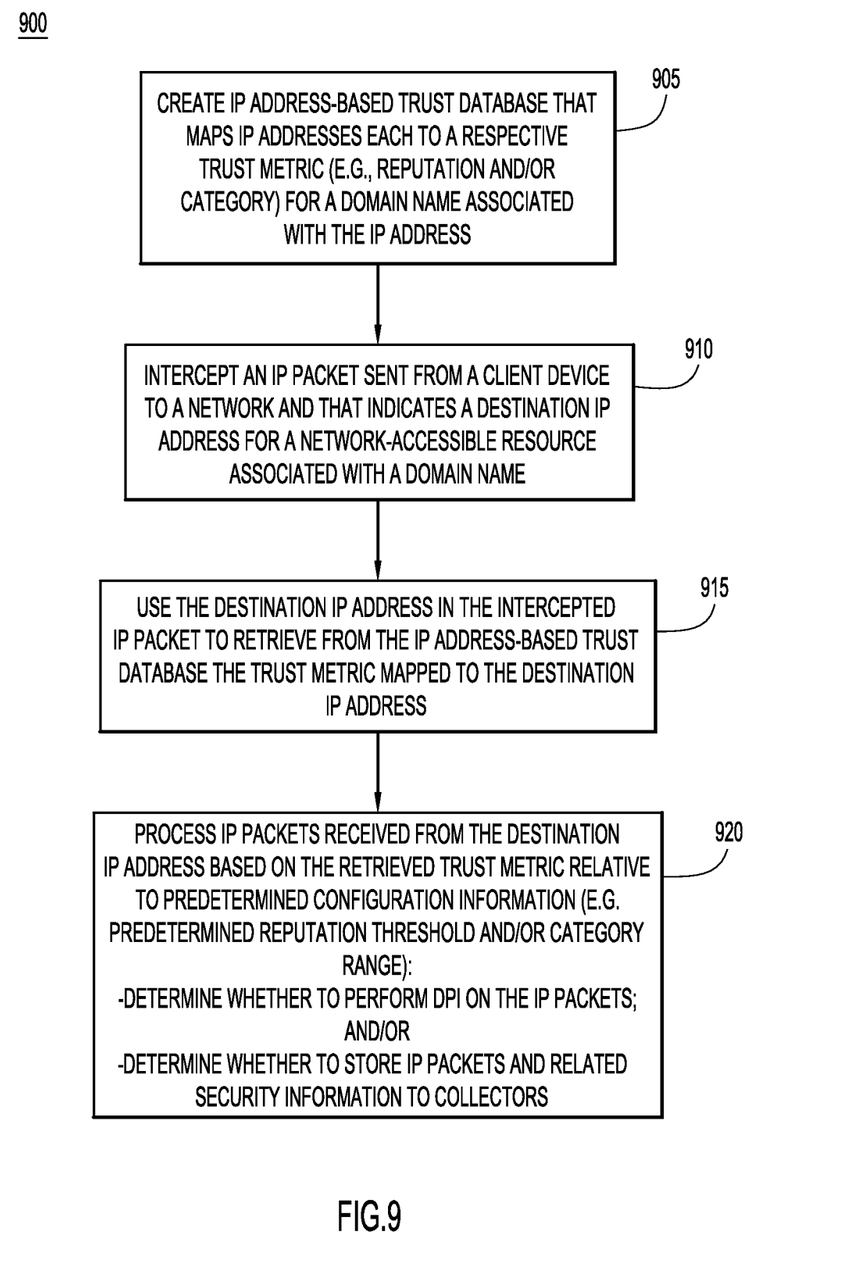
FIG. 9 is a flowchart of a generalized method that combines operations from FIGS. 4, 8A, and 8B, according to an example embodiment.

With reference to FIG. 9, there is a flowchart of an example generalized method 900 of creating and using IP address-based trust database 122. In the ensuing description, domain name reputation and category are considered examples of domain name trustworthiness metrics (more simply referred to as "trust metrics"). The operations of method 900 include various operations described above in connection with FIGS. 4, 8A, and 8B.

At 905, network device 102 creates IP address-based trust database 122 that maps IP addresses each to a respective trust metric (e.g., reputation and/or category) for a domain name associated with the IP address.

At 910, network device 102 intercepts an IP packet sent from a client device (e.g., from one of clients client1-clientN) to network 106 and that indicates a destination IP address for a network-accessible resource (e.g., a content server that sources content) associated with a domain name.

At 915, network device 102 use the destination IP address in the intercepted IP packet to retrieve from IP address-based trust database 122 the trust metric (reputation/category) mapped to the destination IP address. Network 102 also retrieves predetermined configuration information 712 (e.g., the predetermined reputation threshold and/or the predetermined category range). Predetermined configuration information 712 is also referred to as predetermined trust metric criteria or constraints, e.g., the reputation threshold is a first predetermined trust metric criterion and the category range is a second predetermined trust metric criterion.

At 920, network 102 processes IP packets received from the destination IP address based on the retrieved trust metric (e.g., domain name reputation and/or category) and predetermined configuration information 712 (e.g., the predetermined reputation threshold and/or the predetermined category range). For example, network 102 determines whether to perform DPI on the IP packets and/or whether to store IP packets and related security information to collectors 108.

In summary, in one embodiment, DNS snooping is used to learn the mapping between a domain name and its IP address. The mapping helps a firewall build an IP address-based trust data base (e.g., IP address-based reputation/category database), which is consulted to determine the reputation for the flow packets from a content server. If the reputation is larger than a configured threshold value, server packet inspection can be safely skipped. Since the IP address-based trust database is keyed/indexed by the server IP address, the server packets only need to be parsed up to the layer 3 (IP layer) to obtain a reputation. This greatly improves firewall performance to make a real-time decision if an inspection is required. Conventional techniques require the IP packets to be parsed up to layer 7 to make a decision if an inspection is needed.

The DNS snooping may also be used to build the IP address-based trust database so that its content can be used for deciding whether to store received IP packet related records. This approach avoids the need for performing DPI on packets in a flow of data packets to determine whether the packets or information related thereto is to be stored to collectors. The generation and sending of the records to a collector can be further filtered based on security information for the flow of packets.

In summary, in one form, a method is provided comprising: at a network device through which client devices communicate with a network: creating an Internet Protocol (IP) address-based trust database that maps IP addresses each to a respective trust metric for a domain name associated with the IP address; intercepting an IP packet sent from a client device to the network and that indicates a destination IP address for a network-accessible resource associated with a domain name; using the destination IP address in the intercepted IP packet, retrieving from the IP address-based trust database the domain name trust metric mapped to the destination IP address; and processing IP packets received from the destination IP address based on the retrieved domain name trust metric and a predetermined trust metric criterion.

In another form, an apparatus is provided that includes a network interface unit configured to communicate with client devices over a network; and a processor coupled to the network interface unit and configured to: create an Internet Protocol (IP) address-based trust database that maps IP addresses each to a respective trust metric for a domain name associated with the IP address; intercept an IP packet sent from a client device to the network and that indicates a destination IP address for a network-accessible resource associated with a domain name; using the destination IP address in the intercepted IP packet, retrieve from the IP address-based trust database the domain name trust metric mapped to the destination IP address; and process IP packets received from the destination IP address based on the retrieved domain name trust metric and a predetermined trust metric criterion.

In yet another form, a non-transitory processor readable medium is provided. The processor readable medium stores instructions that, when executed by a processor, cause the processor to: create an Internet Protocol (IP) address-based trust database that maps IP addresses each to a respective trust metric for a domain name associated with the IP address; intercept an IP packet sent from a client device to the network and that indicates a destination IP address for a network-accessible resource associated with a domain name; using the destination IP address in the intercepted IP packet, retrieve from the IP address-based trust database the domain name trust metric mapped to the destination IP address; and process IP packets received from the destination IP address based on the retrieved domain name trust metric and a predetermined trust metric criterion.

The above description is intended by way of example only. Various modifications and structural changes may be made therein without departing from the scope of the concepts described herein and within the scope and range of equivalents of the claims.

What is claimed is:
1. A method comprising:
at a network device through which client devices communicate with a network:
creating an Internet Protocol (IP) address-based trust database that maps IP addresses each to a respective trust metric for a domain name associated with each said IP address wherein the respective trust metric for the domain name includes a respective domain name category represented as a number;
intercepting an IP packet sent from a client device to the network and that indicates a destination IP address for a network-accessible resource associated with a domain name;
using the destination IP address in the intercepted IP packet, retrieving from the IP address-based trust database the domain name trust metric, including the respective domain name category, mapped to the destination IP address; and
processing IP packets received from the destination IP address based on the retrieved domain name trust metric and a predetermined trust metric criterion, the processing including:
comparing the retrieved domain name category to a predetermined number range representative of the predetermined trust metric criterion to determine whether the retrieved domain name category is in the predetermined number range and, based on results of the comparing:
depending on whether the retrieved domain name category is in the predetermined number range or is not in the predetermined number range, respectively sending or not sending header information in each of the IP packets to a data store.

2. The method of claim 1, wherein:
the creating includes creating the IP address-based trust database to map IP addresses each to a respective domain name reputation that represents the respective trust metric for the domain name;
the retrieving includes retrieving from the IP address-based trust database the domain name reputation mapped to the destination IP address; and
the processing includes:
  determining, based on the retrieved domain name reputation and a predetermined domain name reputation threshold representative of the predetermined trust metric criterion, whether deep packet inspection should be performed on IP packets received from the destination IP address; and
  upon determining that deep packet inspection should not be performed, passing the IP packets received from the destination IP address to the client device without performing deep packet inspection on the IP packets.

3. The method of claim 2, wherein the processing further comprises:
upon determining that deep packet inspection should be performed, performing deep packet inspection on the IP packets received from the destination IP address.

4. The method of claim 2, wherein the deep packet inspection includes Open System Interconnection (OSI) layer 7 inspection.

5. The method of claim 2, wherein the determining includes:
comparing the retrieved domain name reputation to the predetermined domain name reputation threshold to determine whether the retrieved domain name reputation is above the domain name reputation threshold;
if the comparing indicates that the domain name reputation is equal to or below the domain name reputation threshold, declaring that deep packet inspection should be performed; and
if the comparing indicating that the domain name reputation is above the domain name reputation threshold, declaring that deep packet inspection should not be performed.

6. The method of claim 1, wherein
the processing further includes:
  determining, based on the retrieved domain name category and the predetermined domain name trust metric criterion, whether to send header information in each of the IP packets received from the destination IP address to the data store;
  upon determining to send the header information in each of the IP packets to the data store, sending the header information in each of the IP packets to the data store; and
  upon determining not to send the header information in each of the IP packets to the data store, not sending the header information in each of the IP packets to the data store.

7. The method of claim 1, wherein the creating comprises:
intercepting domain name system (DNS) transactions between the client devices and a DNS database used to resolve domain names to respective IP addresses;
accessing, in a predetermined domain name-based trust database, respective trust metrics for domain names; and
generating, based on the intercepting and the accessing, entries in the IP address-based trust database each to map a respective one of the IP addresses to a respective domain name trust metric.

8. The method of claim 7, wherein:
each DNS transaction includes a DNS query from each client device to the DNS IP address-based trust database to resolve a domain name in the DNS query to an IP address, and a DNS reply to the client device and that includes the resolved IP address from the DNS database; and
intercepting DNS transactions includes intercepting each DNS reply.

9. An apparatus comprising:
a network interface unit configured to communicate with client devices over a network; and
a processor coupled to the network interface unit and configured to:
  create an Internet Protocol (IP) address-based trust database that maps IP addresses each to a respective trust metric for a domain name associated with the each said IP address, wherein the respective trust metric for the domain name includes a respective domain name category represented as a number;
  intercept an IP packet sent from a client device to the network and that indicates a destination IP address for a network-accessible resource associated with a domain name;
  using the destination IP address in the intercepted IP packet, retrieve from the IP address-based trust database the domain name trust metric, including the respective domain name category, mapped to the destination IP address; and
  process IP packets received from the destination IP address based on the retrieved domain name trust metric and a predetermined trust metric criterion, wherein the processor is further configured to:
    compare the retrieved domain name category to a predetermined number range representative of the predetermined trust metric criterion to determine whether the retrieved domain name category is in the predetermined number range and, based on results of the compare:
    depending on whether the retrieved domain name category is in the predetermined number range or is not in the predetermined number range, respectively send or not send header information in each of the IP packets to a data store.

10. The apparatus of claim 9, wherein:
the processor is configured to create by creating the IP address-based trust database to map IP addresses each to a respective domain name reputation that represents the respective trust metric for the domain name;
the processor is configured to retrieve by retrieving includes retrieving from the IP address-based trust database the domain name reputation mapped to the destination IP address; and
the processor is configured to process by:
  determining, based on the retrieved domain name reputation and a predetermined domain name reputation threshold representative of the predetermined trust metric criterion, whether deep packet inspection should be performed on IP packets received from the destination IP address; and
  upon determining that deep packet inspection should not be performed, passing the IP packets received from the destination IP address to the client device without performing deep packet inspection on the IP packets.

11. The apparatus of claim 10, wherein the processor is further configured to process by:
upon determining that deep packet inspection should be performed, performing deep packet inspection on the IP packets received from the destination IP address.

12. The apparatus of claim 10, wherein the processor is configured to perform the determining by:
comparing the retrieved domain name reputation to the predetermined domain name reputation threshold to determine whether the retrieved domain name reputation is above the domain name reputation threshold;
if the comparing indicates that the domain name reputation is equal to or below the domain name reputation threshold, declaring that deep packet inspection should be performed; and
if the comparing indicating that the domain name reputation is above the domain name reputation threshold, declaring that deep packet inspection should not be performed.

13. The apparatus of claim 9, wherein
the processor is configured to process by:
determining, based on the retrieved domain name category and the predetermined domain name trust metric criterion, whether to send header information in each of the IP packets received from the destination IP address to the data store;
upon determining to send the header information in each of the IP packets to the data store, sending the header information in each of the IP packets to the data store; and
upon determining not to send the header information in each of the IP packets to the data store, not sending the header information in each of the IP packets to the data store.

14. The apparatus of claim 9, wherein the processor is configured to create by:
intercepting domain name system (DNS) transactions between the client devices and a DNS database used to resolve domain names to respective IP addresses;
accessing, in a predetermined domain name-based trust database, respective trust metrics for domain names; and
generating, based on the intercepting and the accessing, entries in the IP address-based trust database each to map a respective one of the IP addresses to a respective domain name trust metric.

15. A non-transitory computer readable storage media encoded with instructions that, when executed by a processor of a network device through which client devices communicate with a network, cause the processor to:
create an Internet Protocol (IP) address-based trust database that maps IP addresses each to a respective trust metric for a domain name associated with the each said IP address, wherein the respective trust metric for the domain name includes a respective domain name category represented as a number;
intercept an IP packet sent from a client device to the network and that indicates a destination IP address for a network-accessible resource associated with a domain name;
using the destination IP address in the intercepted IP packet, retrieve from the IP address-based trust database the domain name trust metric, including the respective domain name category, mapped to the destination IP address; and
process IP packets received from the destination IP address based on the retrieved domain name trust metric and a predetermined trust metric criterion, wherein the instructions to cause the processor to process include instructions to cause the processor to:
compare the retrieved domain name category to a predetermined number range representative of the predetermined trust metric criterion to determine whether the retrieved domain name category is in the predetermined number range and, based on results of the compare:
depending on whether the retrieved domain name category is in the predetermined number range or is not in the predetermined number range, respectively send or not sending header information in each of the IP packets to a data store.

16. The computer readable storage media of claim 15, wherein:
the instructions to cause the processor to create include instructions to cause the processor to create the IP address-based trust database to map IP addresses each to a respective domain name reputation that represents the respective trust metric for the domain name;
the instructions to cause the processor to retrieve include instructions to cause the processor to retrieve from the IP address-based trust database the domain name reputation mapped to the destination IP address; and
the instructions to cause the processor to process include instructions to cause the processor to:
determine, based on the retrieved domain name reputation and a predetermined domain name reputation threshold representative of the predetermined trust metric criterion, whether deep packet inspection should be performed on IP packets received from the destination IP address; and
upon determining that deep packet inspection should not be performed, pass the IP packets received from the destination IP address to the client device without performing deep packet inspection on the IP packets.

17. The computer readable storage media of claim 16, wherein the instructions to cause the processor to process include further instructions to cause the processor to:
upon determining that deep packet inspection should be performed, perform deep packet inspection on the IP packets received from the destination IP address.

18. The computer readable storage media of claim 16, wherein the instructions to cause the processor to determine include instructions to cause the processor to:
compare the retrieved domain name reputation to the predetermined domain name reputation threshold to determine whether the retrieved domain name reputation is above the domain name reputation threshold;
if the compare indicates that the domain name reputation is equal to or below the domain name reputation threshold, declare that deep packet inspection should be performed; and
if the compare indicates that the domain name reputation is above the domain name reputation threshold, declare that deep packet inspection should not be performed.

19. The computer readable storage media of claim 15, wherein:
the instructions to cause the processor to process include instructions to cause the processor to:

determine, based on the retrieved domain name category and the predetermined domain name trust metric criterion, whether to send header information in each of the IP packets received from the destination IP address to the data store;

upon determining to send the header information in each of the IP packets to the data store, send the header information in each of the IP packets to the data store; and upon determining not to send the header information in each of the IP packets to the data store, not send the header information in each of the IP packets to the data store.

20. The computer readable storage media of claim 15, wherein the instructions to cause the processor to create include instructions to cause the processor to:

intercept domain name system (DNS) transactions between the client devices and a DNS database used to resolve domain names to respective IP addresses;

access, in a predetermined domain name-based trust database, respective trust metrics for domain names; and generate, based on the intercepting and the accessing, entries in the IP address-based trust database each to map a respective one of the IP addresses to a respective domain name trust metric.

\* \* \* \* \*